US 8,685,561 B2

(12) United States Patent
Choi

(10) Patent No.: US 8,685,561 B2
(45) Date of Patent: Apr. 1, 2014

(54) RECHARGEABLE BATTERY

(75) Inventor: Bumkuk Choi, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1919 days.

(21) Appl. No.: 11/976,889

(22) Filed: Oct. 29, 2007

(65) Prior Publication Data

US 2008/0102356 A1    May 1, 2008

(30) Foreign Application Priority Data

Oct. 27, 2006  (KR) .................. 10-2006-0105085

(51) Int. Cl.
  *H01M 6/00* (2006.01)
  *H01M 10/00* (2006.01)
  *H01M 2/00* (2006.01)
  *H01M 2/08* (2006.01)

(52) U.S. Cl.
  USPC ............ 429/163; 429/122; 429/175; 429/178

(58) Field of Classification Search
  USPC ........................................ 429/163
  See application file for complete search history.

(56) References Cited

U.S. PATENT DOCUMENTS

| | | | |
|---|---|---|---|
| 2003/0180582 A1 | 9/2003 | Masumoto et al. | |
| 2004/0091769 A1* | 5/2004 | Kawabata et al. | 429/163 |
| 2005/0089753 A1 | 4/2005 | Yoon | |
| 2005/0214597 A1* | 9/2005 | Kim et al. | 429/7 |
| 2005/0221176 A1 | 10/2005 | Kim | |
| 2006/0003192 A1 | 1/2006 | Lim | |
| 2006/0046139 A1 | 3/2006 | Suzuki et al. | |

FOREIGN PATENT DOCUMENTS

| | | |
|---|---|---|
| EP | 1204154 A2 | 5/2002 |
| EP | 1473786 A1 | 11/2004 |
| JP | 07-220700 A | 8/1995 |
| JP | 2002-343336 A | 11/2002 |
| JP | 2003086159 | 3/2003 |
| JP | 2004044653 | 2/2004 |

(Continued)

OTHER PUBLICATIONS

Japanese Office Action issued by JPO, dated Feb. 22, 2011, corresponding to Japanese Patent Application No. 2007-249871, together with Request for Entry.

*Primary Examiner* — Barbara Gilliam
*Assistant Examiner* — Steven Scully
(74) *Attorney, Agent, or Firm* — Robert E. Bushnell, Esq.

(57) ABSTRACT

The present invention relates to a rechargeable battery and, more particularly, to a rechargeable battery for preventing detachment due to deformation of a resin member by strengthening the fixing force of the resin member connecting a bare cell with a protection circuit module.

The rechargeable battery according to the present invention includes a bare cell provided with a cap plate; a protection circuit module; and a resin member, wherein the rechargeable battery further includes a reinforcing member composed of a support plate part connected to one side of the cap plate and provided with a rivet through-hole; a resin fixing part integrally formed with one end of the support plate part, and bent at a certain angle in the direction of the protection circuit module and protruded therefrom; and a rivet connecting part fixing the support plate part to the cap plate by perforating the rivet through-hole.

According to the present invention, the present invention prevents the resin member from being deformed by the external force as the fixing force is increased by the fixing reinforcing member, and further prevents the resin member from being detached out of the bare cell.

17 Claims, 10 Drawing Sheets

(56) References Cited

FOREIGN PATENT DOCUMENTS

| | | |
|---|---|---|
| JP | 2006066090 A | 3/2006 |
| KR | 10-2005-0039387 A | 4/2005 |
| KR | 10-0537538 B1 | 12/2005 |
| KR | 10-0561308 B1 | 12/2005 |
| KR | 10-2006-0010654 A | 2/2006 |
| KR | 10-0560514 B1 | 3/2006 |
| WO | 2006/054655 A1 | 5/2006 |

\* cited by examiner

RECHARGEABLE BATTERY

CLAIM OF PRIORITY

This application makes reference to, incorporates the same herein, and claims all benefits accruing under 35 U.S.C. §119 from an application for RECHARGEABLE BATTERY earlier filed in the Korean Intellectual Property Office on 27 Oct. 2006 and there duly assigned Serial No. 10-2006-0105085.

BACKGROUND OF THE INVENTION

1. Field of the Invention

The present invention relates to a rechargeable battery and, more particularly, to a rechargeable battery which is not to be detached due to deformation of a molded resin member by strengthening the fixing force of the molded resin member connecting a bare cell with a protection circuit module.

2. Description of the Related Art

In general, a rechargeable battery is a battery which may be used repeatedly by recharging, in contrast with a disposable battery. Rechargeable batteries are used as main power sources of portable devices for communication, information processing and audio/video. In recent years, the rechargeable battery has rapidly developed and prevailed in the industry, since the rechargeable battery is a power source having ultra-lightweight, high energy density, high output voltage, low self-discharge, environmental-friendly battery and long life time.

The rechargeable battery is classified into a nickel-metal hydride (Ni-MH) battery and a lithium ion (Li-ion) battery in accordance with an electrode active material, in particular the lithium ion battery is classified into a liquid electrolyte lithium ion battery, a solid polymer electrolyte lithium ion battery and a gel electrolyte lithium ion battery according to a kind of electrolytes. Also, the rechargeable battery is classified into various kinds of a can-type battery and, a pouch-type battery and other types of batteries according to the shape of a container in which an electrode assembly is accommodated.

It is possible for the lithium ion battery to have ultra-lightweight, because the lithium ion battery has considerably higher energy density than that of the disposable battery. The lithium ion battery has an average voltage of 3.6V per cell, which is three times higher than 1.2 V of a nickel-cadmium battery or a nickel-hydrogen battery, thus the lithium ion battery has three times larger compact effects. Also, the lithium ion battery has advantages that the self-discharge rate of the lithium ion battery is less than 5% per month at 20° C. and this percentage is ⅓ level of the nickel-cadmium battery or the nickel-hydrogen battery, and that the lithium ion battery is an environmental-friendly battery because of not using heavy metals such as Cd or Hg, and that the lithium ion battery may be repeatedly recharged or discharged over 1000 times in the normal state. Therefore, the lithium ion battery has been rapidly developing because of the above described advantages while information & communication technologies have been developing.

A bare cell of a conventional rechargeable battery is formed by providing an electrode assembly composed of an anode plate, a cathode plate and a separator into a can made of aluminum or aluminum alloy, covering an upper opening of the can with a cap assembly, and then injecting the electrolyte therein and sealing the can. When the can is made of Al or Al alloy as described above, the light weight of the battery is achieved due to the aluminum's property and the battery does not corrode even after long periods of use under high voltages.

The sealed bare cell is electrically connected with a protection circuit module, and the protection circuit module is composed of safety devices such as a positive temperature coefficient (PTC) device, a thermal fuse, a protection circuit board, and other battery parts.

Connecting terminals of the protection circuit board are electrically connected with the bare cell through separate lead plates, a cap plate provided in the bare cell is connected to an anode terminal of the protection circuit board by an anode lead plate, and a cathode terminal of the bare cell is connected to a cathode terminal of the protection circuit board by a cathode lead plate.

The bare cell and the protection circuit module, which are electrically connected with each other, are received in a separate hard pack in order to tie-up the connection or form complete external appearance of the rechargeable battery by means of the molded resin member made of a hot melt resin.

On the other hand, if the molded resin member, which binds the bare cell to the protection circuit module electrically connected with the bare cell, is twisted to a certain angle, problems may occur on the electrical connections including the anode and cathode terminals of the bare cell, the lead plates, and the external terminal of the protection circuit board, thus the safety devices of the battery may not operate, even though the molded resin member is not totally broken down.

As described above, when the molded resin member is molded in the shape of pack battery by using the melt resin, the molded resin member is deformed by the twist or bend of the pack relatively compared with the bare cell, thus the molded resin member is detached from the bare cell.

SUMMARY OF THE INVENTION

It is therefore an object of the present invention to provide an improved rechargeable battery an improved process for manufacturing rechargeable batteries.

It is another object to provide a rechargeable battery which will not become detached due to deformation of a molded resin member by strengthening the fixing force of the molded resin member connecting a bare cell with a protection circuit module.

The present invention has been contrived to resolve the problems discovered to exist in conventional practice, and an object of the present invention is to provide a rechargeable battery preventing the rechargeable battery from being bent or deformed by external forces by increasing shear stress of the resin member to strengthen the fixing force, thus preventing the resin member from being detached from the bare cell.

To achieve the above described object, the rechargeable battery according to the present invention includes: a bare cell provided with a cap plate; a protection circuit module electrically connected to upper part of the bare cell; and a resin member poured into a gap between the bare cell and the protection circuit module and molded therein, wherein the rechargeable battery further includes a reinforcing member composed of a support plate part connected to one side of the cap plate and provided with a rivet through-hole; a resin fixing part integrally formed with one end of the support plate part, and bent at a certain angle in the direction of the protection circuit module and protruded therefrom; and a rivet connecting part fixing the support plate part to the cap plate by perforating the rivet through-hole.

The resin fixing part may includes at least one resin supporting hole which supports the resin member since a perforating resin is molded therein.

The reinforcing member may be composed of a protrusing part in which the rivet connecting part is integrally formed on one side of the cap plate and the upper part of the rivet connecting part is pressed.

The reinforcing member may have the shape of a right angle 'L' as the resin fixing part is bent at a right angle together with the support plate part.

The reinforcing member may be formed as the resin fixing part is bent at an acute angle based on the support plate part.

The reinforcing member may be formed as the resin fixing part is bent at an obtuse angle based on the support plate part.

Further, the reinforcing member may further have a resin fixing part, which is corresponding to the resin fixing part pre-formed by taking the perpendicular at midpoint of the support plate part as an axis, on the other end of the support plate part.

Another feature of the present invention is that the rechargeable battery includes a bare cell provided with a cap plate; a protection circuit module electrically connected to upper part of the bare cell; and a resin member poured into a gap between the bare cell and the protection circuit module and molded therein, wherein the rechargeable battery may further include a reinforcing member composed of a resin fixing part protruded toward the protection circuit module at one side of the cap plate and supports the resin member by forming at least one resin supporting hole supporting the resin member as the perforating resin is molded; and a rivet connecting part formed on the bottom of the resin fixing part and attached to the cap plate.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 2b is a cross sectional view taken along the line II-II of FIG. 2a.

FIG. 3b is a cross sectional view taken along the line III-III of FIG. 3a.

FIG. 4b is a cross sectional view illustrating a reinforcing member attached to a cap plate taken along the line IV-IV of FIG. 4a.

DETAILED DESCRIPTION OF THE INVENTION

Hereinafter, exemplary embodiments of rechargeable batteries according to the present invention will be described in detail with reference to the accompanying drawings.

Figure 1:
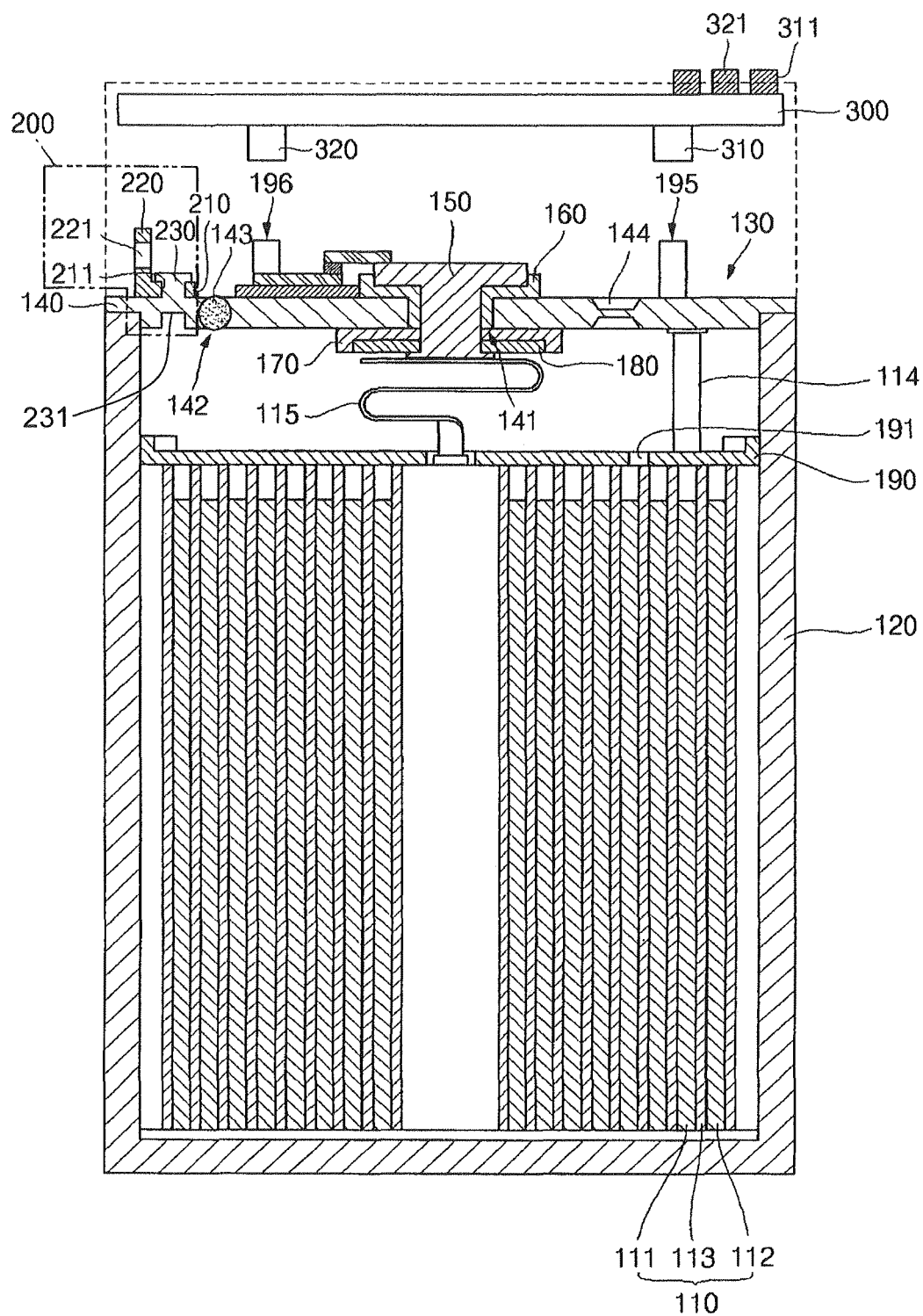
FIG. 1 is an exploded perspective view illustrating a rechargeable battery cut longitudinally according to one embodiment of the present invention.

As described in FIG. 1, a rechargeable battery according to one embodiment of the present invention includes a bare cell 100, a protection circuit module 300 which is electrically connected to the upper part of bare cell 100, and a resin member connecting bare cell 100 with protection circuit module 300.

Bare cell 100 is composed of an electrode assembly 110, a can housing the electrode assembly 110, and a cap assembly 130 sealing an upper opening of a can 120.

Electrode assembly 110 is formed by laminating and winding a anode plate 111 on which a anode active material is applied, a cathode plate 112 on which a cathode active material is applied, and a separator 113 interposed between anode plate 111 and cathode plate 112.

A anode tab 114 is electrically connected to anode plate 111 at the region on which a anode coating portion is not formed, and a cathode tab 115 is electrically connected to cathode plate 112 at the region on which a cathode coating portion is not formed. Here, an insulating tape may be rolled up at the boundary region, on which electrode tabs 114 and 115 are draw out of electrode assembly 110, in order to prevent the short circuit between electrode tabs 114 and 115, thus between electrode plates 111 and 112. And, the width of separator 113 is preferably larger than that of anode plate 111 and that of cathode plate 112 to prevent the short circuit between the electrode plates.

An insulating case 190 may be installed on the upper surface of electrode assembly 110 to provide electrical insulation between electrode assembly 110 and cap assembly 130 and to cover the upper end of electrode assembly 110, and insulating case 190 is made of a polymer resin. And, a through-hole 192 is formed at the center of insulating case 190 so that cathode tab 115 passes through, and an electrolyte through-hole 191 is formed on the side of though-hole 192.

Can 120 made of Al or Al alloy has approximately rectangular shape, and can 120 serves as a container of electrode assembly 110 and the electrolyte as electrode assembly 110 is accommodated through the open upper end of the can. And, can 120 itself may serve as a terminal.

Cap assembly 130 is provided with a flat-type cap plate 140 with the size and shape corresponding to the open upper end of can 120. Here, a terminal through-hole 141 is formed at the center of cap plate 140, and a tubular gasket 160 for insulating is installed between an electrode terminal 150, which perforates terminal through-hole 141, and cap plate 140. And, an insulating plate 170 is arranged on the lower surface of cap plate 140, and a terminal plate 180 is formed on the lower surface of insulating plate 170. Further, the bottom of electrode terminal 150 is electrically connected with terminal plate 180. Anode tab 114 extruded from anode plate 111 is welded onto the lower surface of cap plate 140, and cathode tab 115 extruded from cathode plate 112 is welded onto the bottom end of electrode terminal 150 with the state that the cathode tab has the bend in a zigzag shape.

An electrolyte inlet 142 is formed in cap plate 140, and a plug 143 is installed to close the electrolyte inlet 142 after injecting the electrolyte therein. Ball-shape plug 143 is made of Al or metal containing Al, and plug 143 is mechanically pressed into electrolyte inlet 142. And, plug 143 is welded onto cap plate 140 at the surrounding of electrolyte inlet 142 to seal the inlet. Meanwhile, a safety vent 144 is formed in cap plate 140. Safety vent 144 breaks when inner pressure rises over the predetermined pressure, and thereby preventing ignition and explosion of the battery.

And, cap plate 140 includes a reinforcing member 200 which prevents the cap plate from being detached from bare cell 100 as it is deformed by the external force. That is, reinforcing member 200 prevents the deformation against a bending test or a twisting test of the rechargeable battery by increasing the shear stress of the resin member.

A lead tab 195 is formed on cap plate 140 for connecting bare cell 100 to protection circuit module 300.

Figure 5:
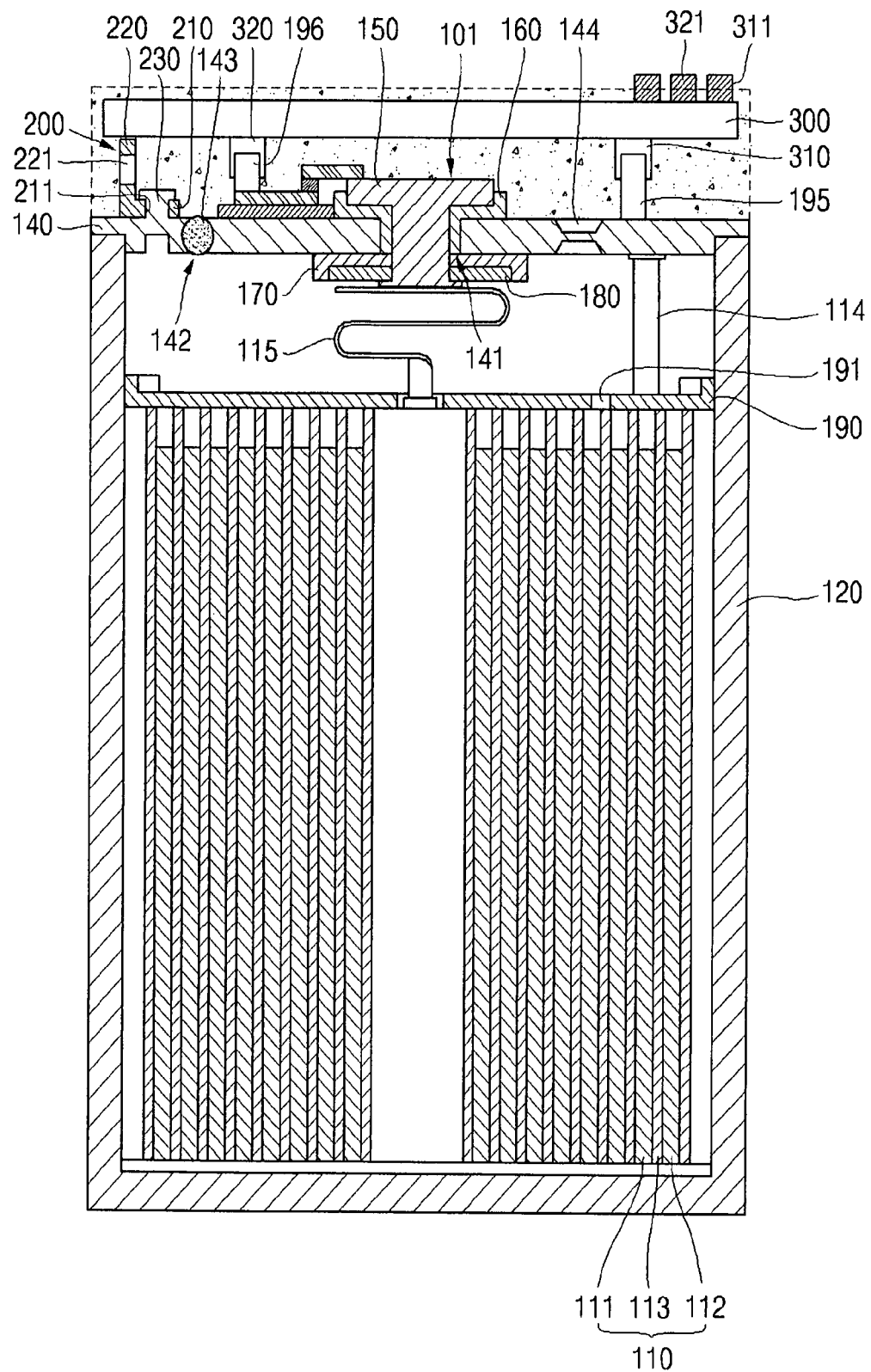
FIG. 5 is a cross sectional view illustrating a rechargeable battery having a molded resin member filled in a gap between a bare cell and a protection circuit module cut longitudinally according to one embodiment of the present invention.

As shown in FIG. 5, an anode lead plate 310 is electrically connected to lead tab 195 which is electrically connected to cap plate 140 and anode tab 114. An anode terminal 311 is electrically connected to anode lead plate 310. Similarly, a cathode lead plate 320 is electrically connected to lead tab 196 which is electrically connect to cathode electrode terminal 150. A cathode terminal 321 is electrically connected to cathode lead plate 320. Therefore, anode terminal and cathode terminal of the battery are formed. Although the bare cell and the protection circuit module are connected by lead tabs 195 and 196 and lead plates 310 and 320, the connecting force needs to be strengthened. Therefore, a resin member 101 is molded in place to fill the space between the bare cell and the protection circuit module. Moreover, the embodiments of present invention further introduce a reinforcing member 200 to further strengthen the connecting force between bare cell and protection circuit module. Before injecting resin into the space between protection circuit module and bare cell, lead tab 195 is connected to anode lead plate 310 by welding and another lead tab 196 is connected to cathode lead plate 310 by welding. Therefore, protection circuit module 300 keeps lead tab 195 and anode lead plate 310 clean and electrically insulated from cathode terminal 150 after the injection of the resin. The cured resin member maintains protection circuit module 300 spaced apart from cathode terminal 150.

Figure 2A:
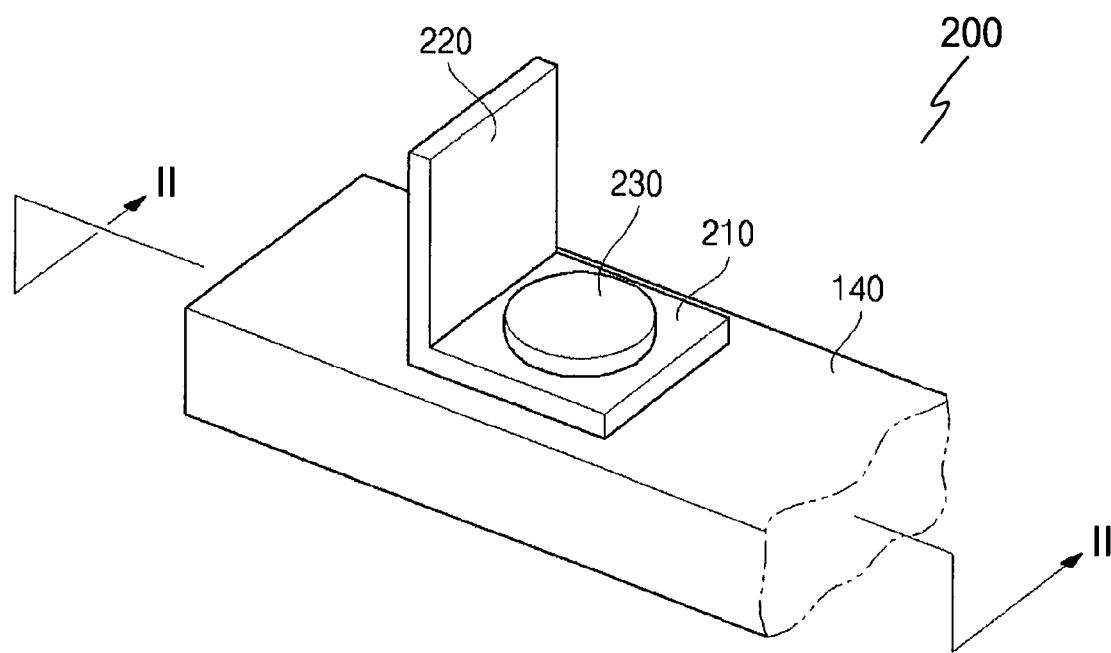
FIG. 2a is a perspective view of a reinforcing member attached to a cap plate according to an exemplary embodiment of the present invention.

As shown in FIG. 2a, reinforcing member 200 is composed of a flat-type support plate part 210; a resin fixing part 220 which is integrally formed with one end of a support plate part 210, and bent at a certain angle in the direction of protection circuit module 300 and protruded therefrom; and a rivet connecting part 230 fixing the support plate part 210 to the cap plate 140.

A rivet through-hole 211, through which rivet connecting part 230 passes, is formed in support plate part 210 at the connecting region corresponding to rivet connecting part 230.

Rivet connecting part 230 is integrally formed on one side of cap plate 140, and composed of a protruding part protruded toward protection circuit module 300. Rivet connecting part 230 serves as a rivet. That is, rivet connecting part 230 perforates rivet through-hole 211 formed in support plate part 210 and attaches support plate part 210 to cap plate 140 when the upper part of the rivet connecting part is pressed. The rivet connecting part 230 geometrically corresponds to a recess 231 which is disposed the lower surface of the cap plate 140.

Meanwhile, it is possible that the rivet connecting part is formed with a separate fixing means, for example a rivet, and a hole is formed at the connecting region corresponding to support plate part 210 and cap plate 140 respectively to perforate the rivet. That is, the rivet is inserted into the holes formed in support plate part 210 and cap plate 140, and then support plate part 210 is attached to cap plate 140 by pressing the rivet exposed on the lower surface of cap plate 140 and upper surface of the support plate part 210.

Figure 2B:
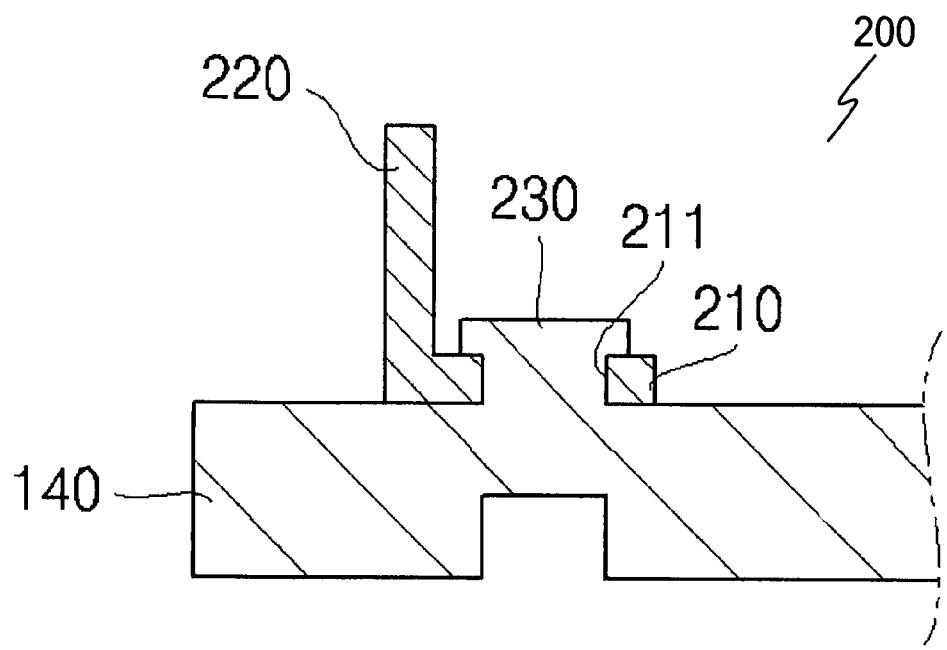

Reinforcing member 200 is formed in the cross sectional shape of a right angle 'L' as resin fixing part 220 is bent at a right angle with respect to support plate part 210 as described in FIG. 2a and FIG. 2b.

Figure 2C:
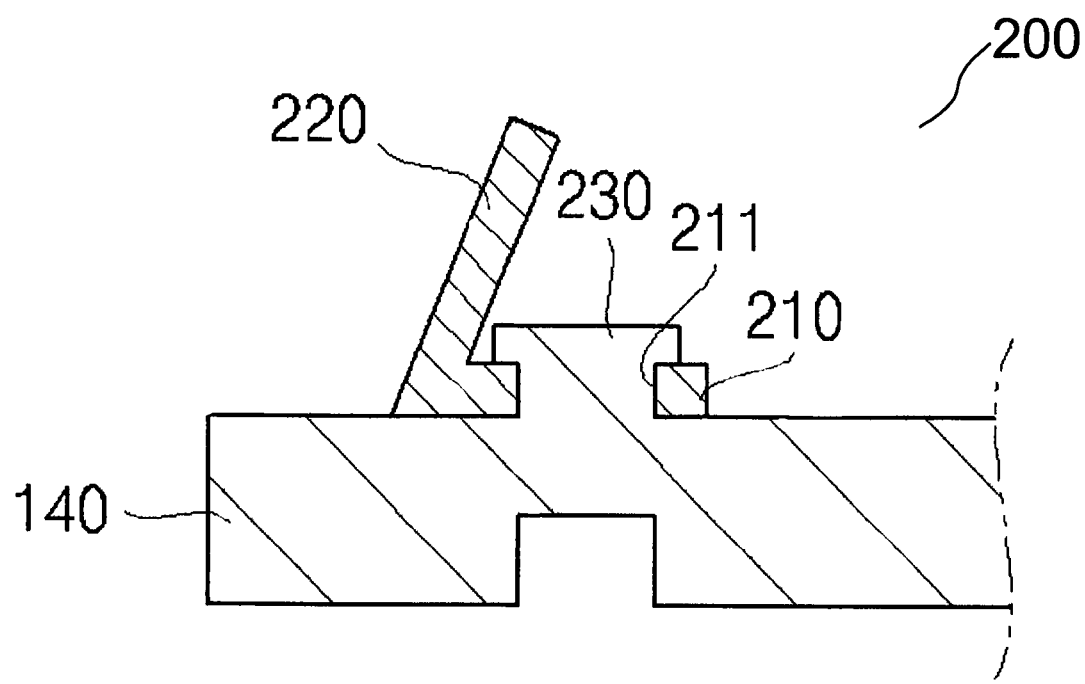
FIGS. 2c, 2d, 2e, 2f and 2g are longitudinal cross sectional views of a reinforcing member attached to a cap plate according to another embodiment of the present invention.

Further, as shown in FIG. 2c, reinforcing member 200 is formed, for example in the shape of an acute angle '∟', as resin fixing part 220 is bent at an acute angle in the direction of protection circuit module 300, which is an upper part of support plate part 210.

Figure 2D:
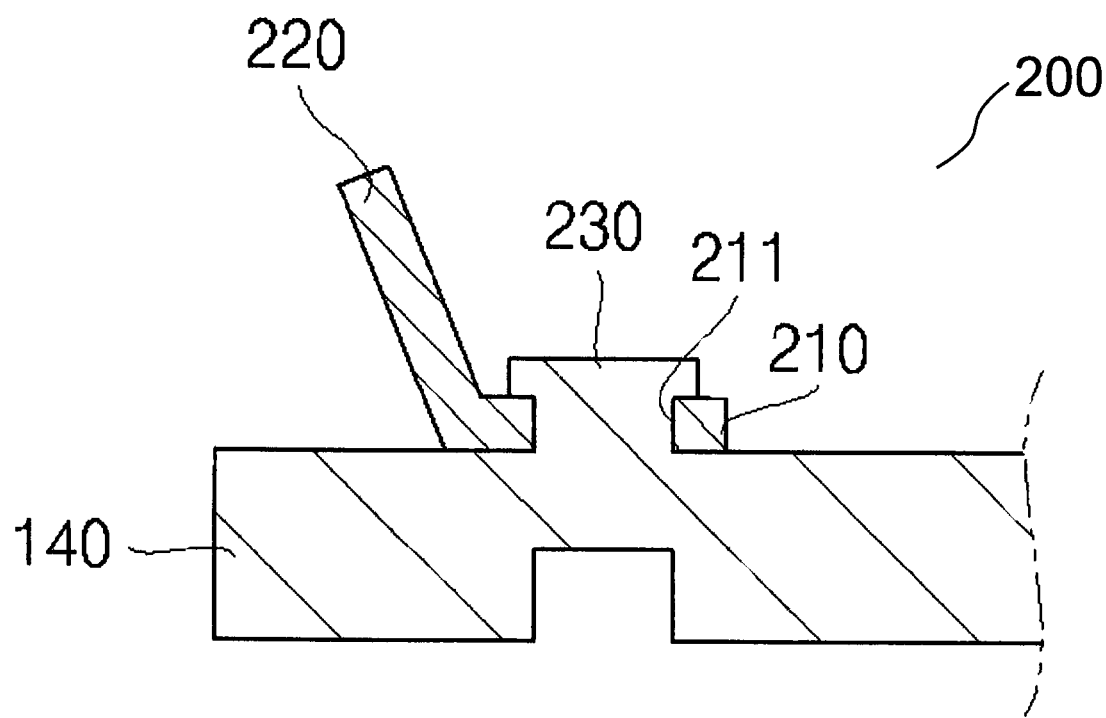

As shown in FIG. 2d, reinforcing member 200 is formed, for example in the shape of an obtuse angle '∟', as resin fixing part 220 is bent at an obtuse angle in the direction of protection circuit module 300.

Further, reinforcing member 200 may have a resin fixing part 220 formed on the other end of support plate part 210 corresponding to resin fixing part 220 which is pre-formed on the support plate part 210 with taking the perpendicular at midpoint of support plate part 210 as an axis.

Figure 2E:
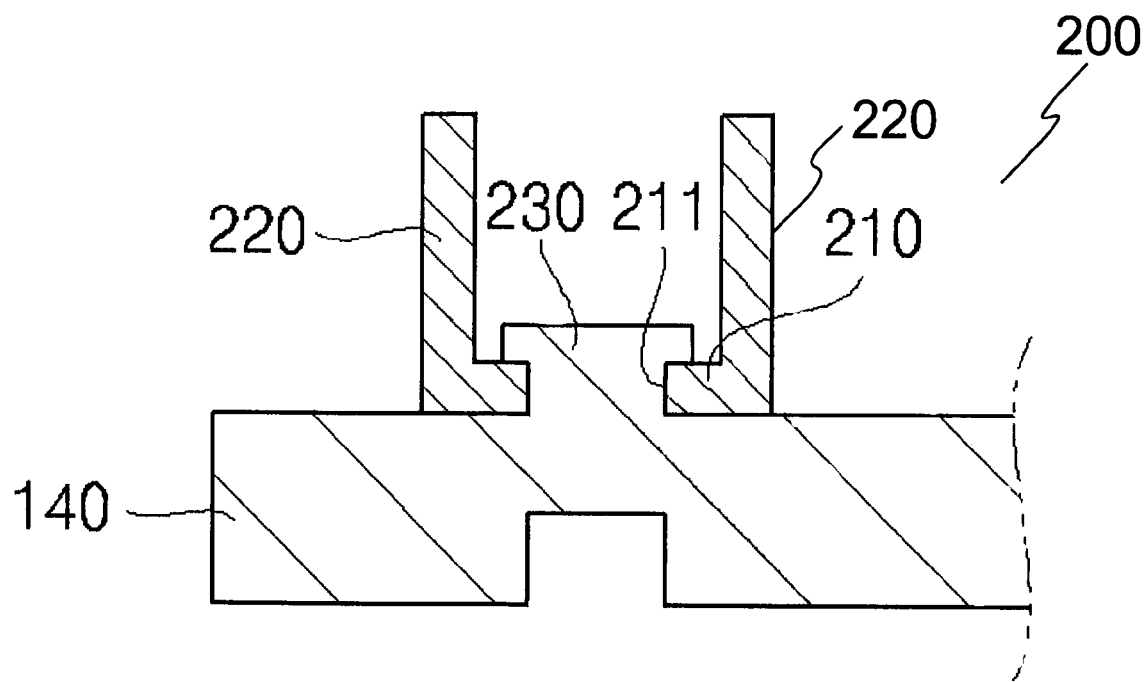
Figure 2F:
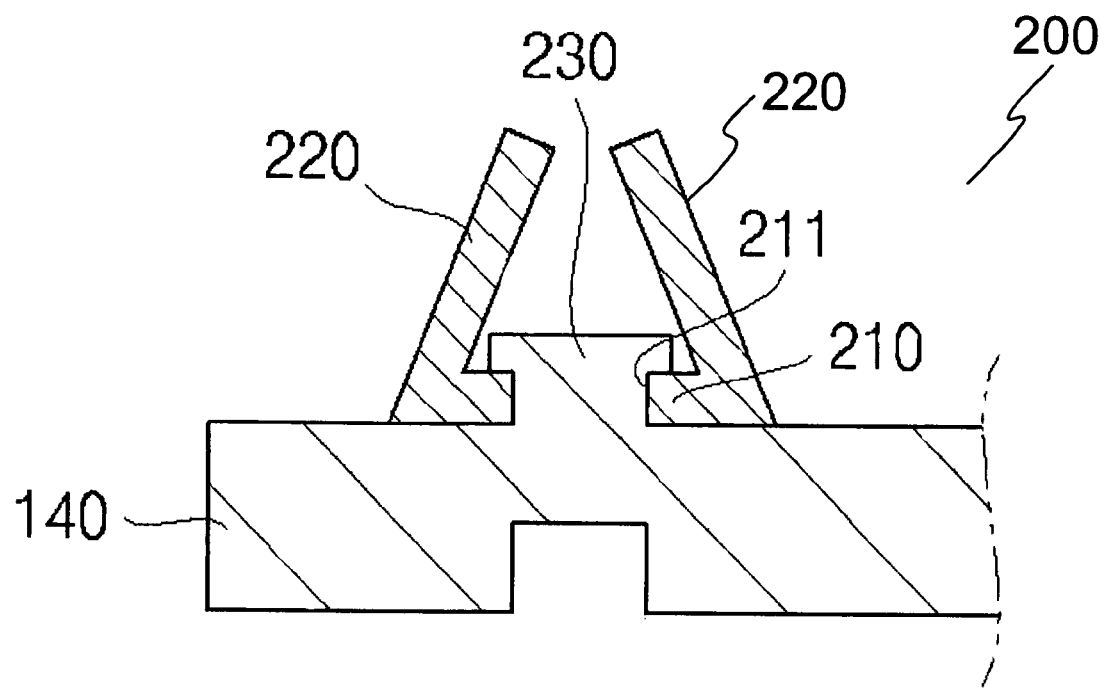
Figure 2G:
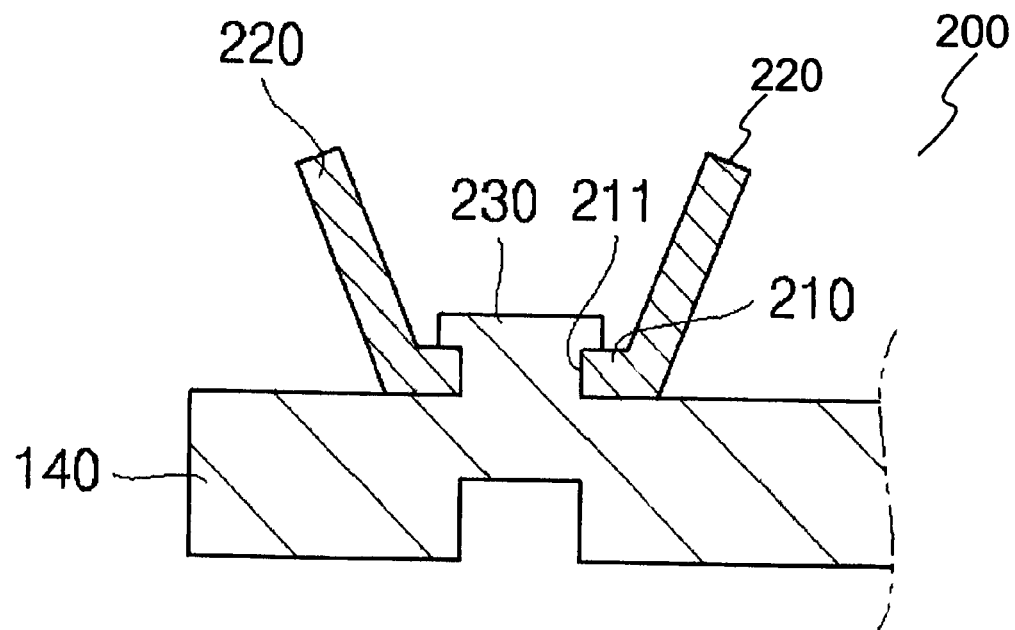

That is, in case that reinforcing member 200 is formed in the shape of a right angle 'L' as resin fixing part 220 is bent at a right angle with respect to support plate part 210, then another resin fixing part 220, which is symmetrically transferred with taking the perpendicular at midpoint of support plate part 210 as an axis, may be further formed to form a C shape (i.e. channel shape) '⊔' as shown in FIG. 2e. Accordingly, in case that reinforcing member 200 is formed, for example in the shape of an acute angle '∟', as resin fixing part 220 is bent at an acute angle in the direction of protection circuit module 300, then the shape of a truncated triable '△' is made as shown in FIG. 2f, and in case that reinforcing member 200 is formed, for example in the shape of an obtuse angle '∟ ' as resin fixing part 220 is bent at an obtuse angle, then the shape of a trough '∪' is made as shown in FIG. 2g.

Figure 3A:
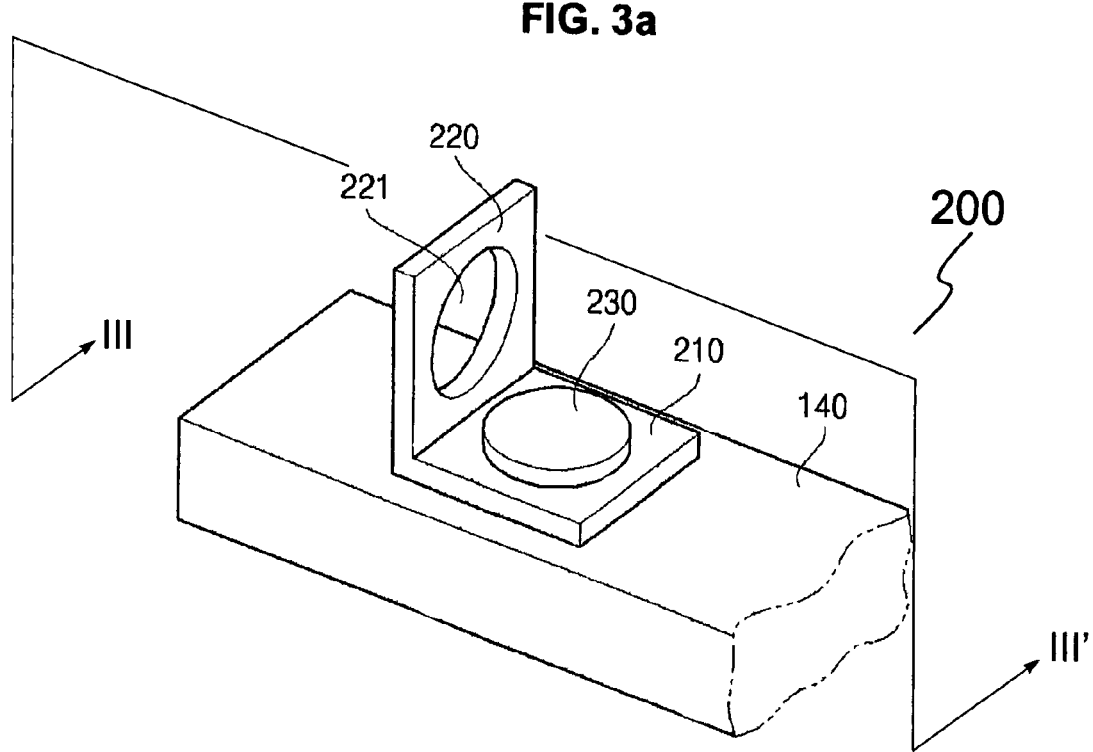
FIG. 3a is a perspective view of a reinforcing member attached to a cap plate according to another embodiment of the present invention.

Meanwhile, as shown in FIG. 3a according to another embodiment, reinforcing member 200 is composed of a flat-type support plate part 210; a resin fixing part 220 which is integrally formed with one end of support plate part 210, and bent at a certain angle in the direction of the protection circuit module 300 and protruded therefrom; and a rivet connecting part 230 attaching the support plate part 210 to the cap plate 140.

As described above, a rivet through-hole 211, through which rivet connecting part 230 passes, is formed in support plate part 210 at the connecting region corresponding to rivet connecting part 230, and also rivet connecting part 230 is composed of a protruding part which is integrally formed on one side of cap plate 140.

Rivet connecting part 230 perforates the rivet through-hole 211 formed in the support plate part 210 and attaches the support plate part 210 to the cap plate 140 when the upper part of the rivet connecting part is pressed.

Unlike the embodiment previously presented, at least one resin supporting hole 221, which supports the resin member when the perforating resin is molded, is formed in resin fixing part 220.

Resin supporting hole 221 is molded by filling the melt resin, and thus the fixing force of the resin member strengthens.

Figure 3B:
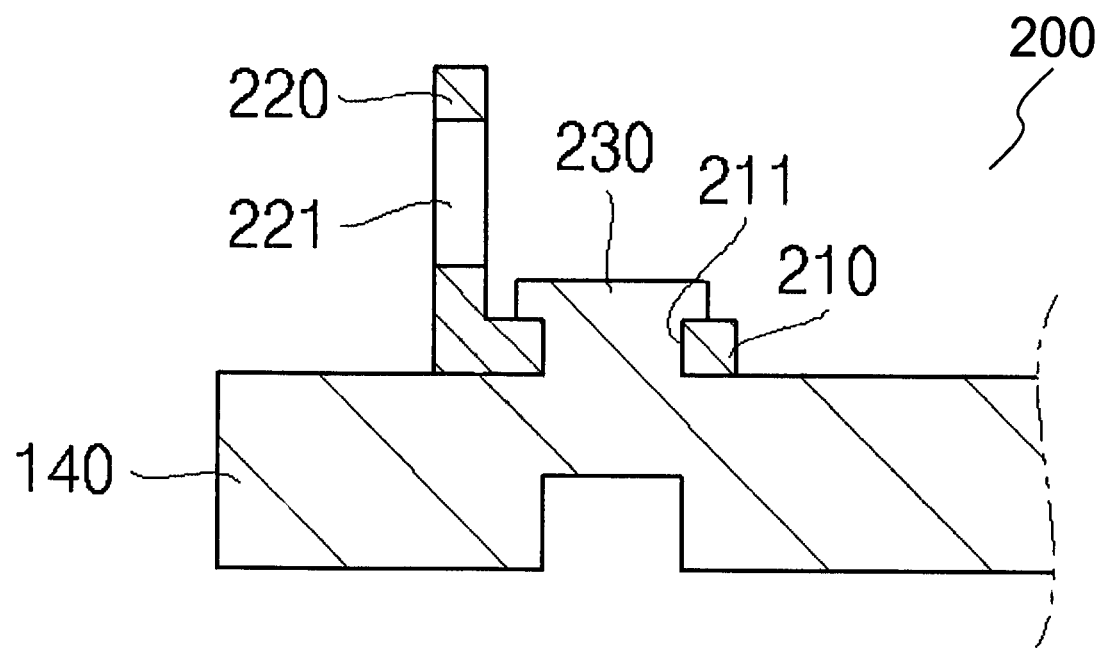

As shown in FIGS. 3a and 3b, reinforcing member 200 is formed in the cross sectional shape of a right angle 'L' as resin fixing part 220 is bent at a right angle with respect to the support plate part 210 as the same manner as the previously described embodiment.

Figure 3C:
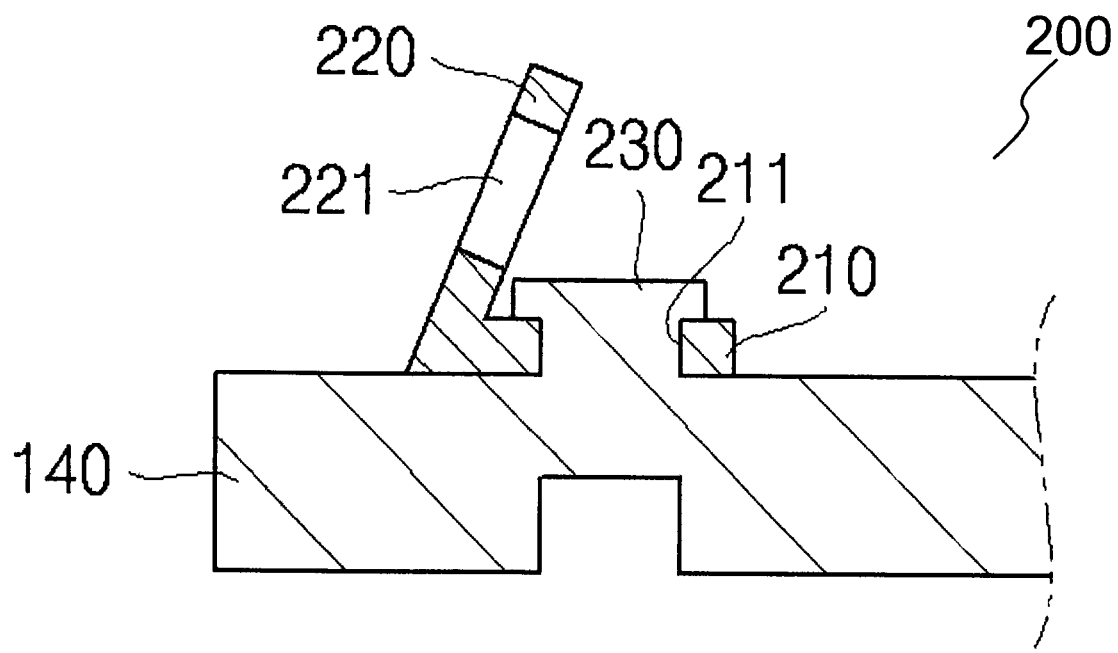
FIGS. 3c, 3d, 3e, 3f and 3g are longitudinal cross sectional views of a reinforcing member attached to a cap plate according to another embodiment of the present invention.
Figure 3D:
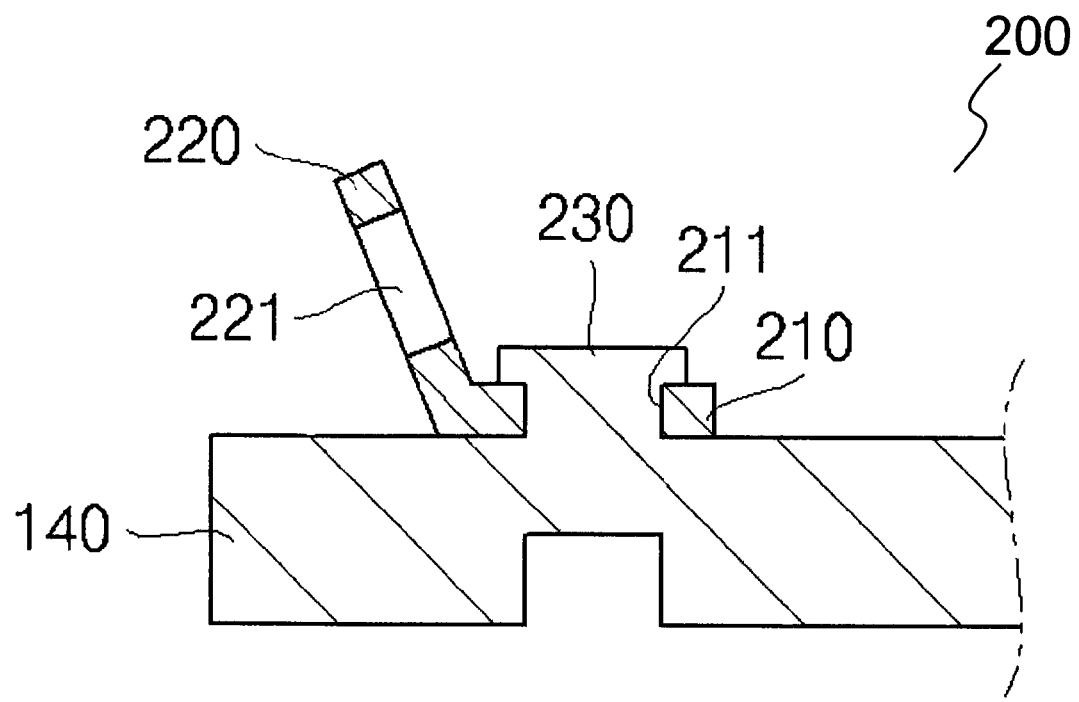

As shown in FIGS. 3c and 3d, reinforcing member 200 is formed, for example in the shape of an acute angle '∟', as resin fixing part 220 is bent at an acute angle with respect to support plate part 210, or reinforcing member 200 is formed, for example in the shape of an obtuse angle '⌐,' as resin fixing part 220 is bent at an obtuse angle with respect to support plate part 210.

Figure 3E:
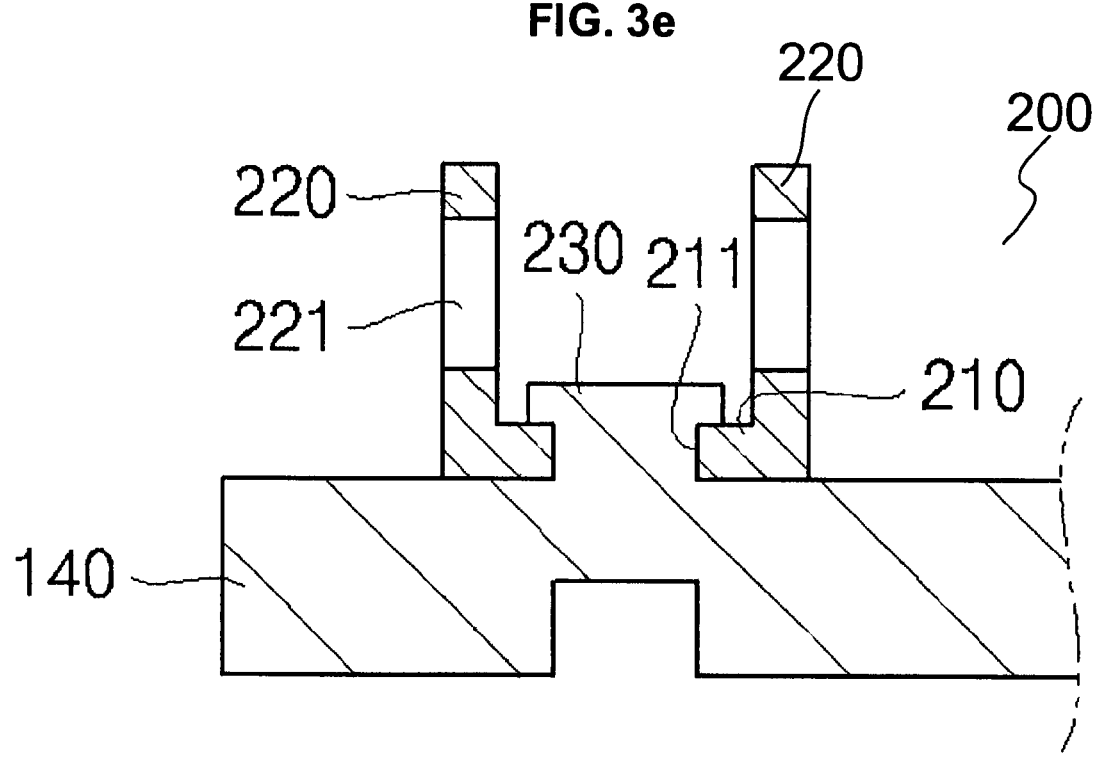
Figure 3F:
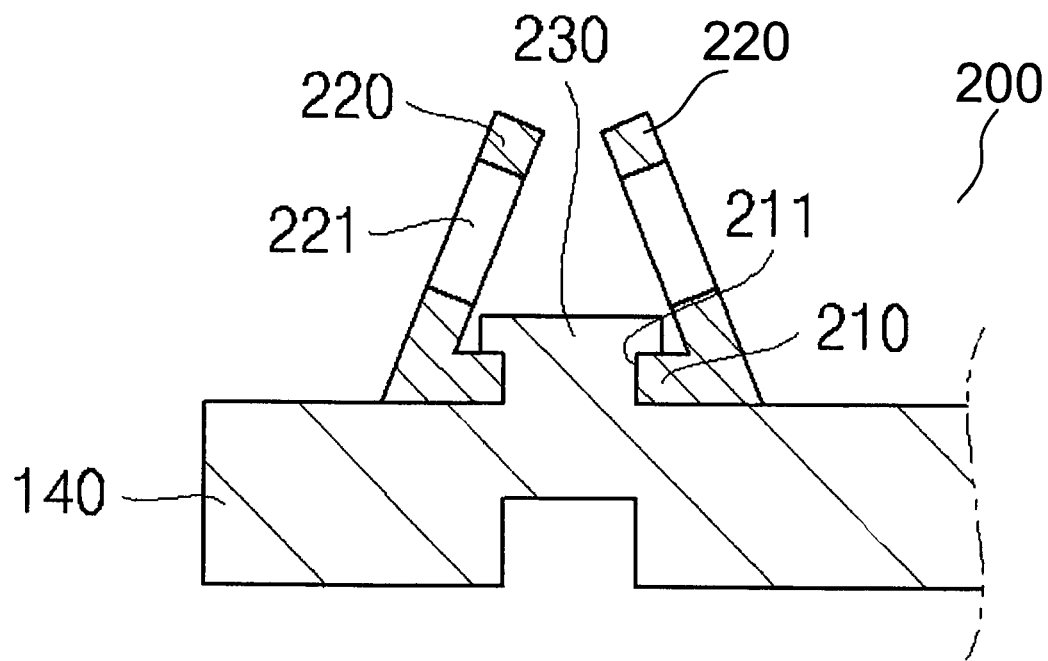
Figure 3G:
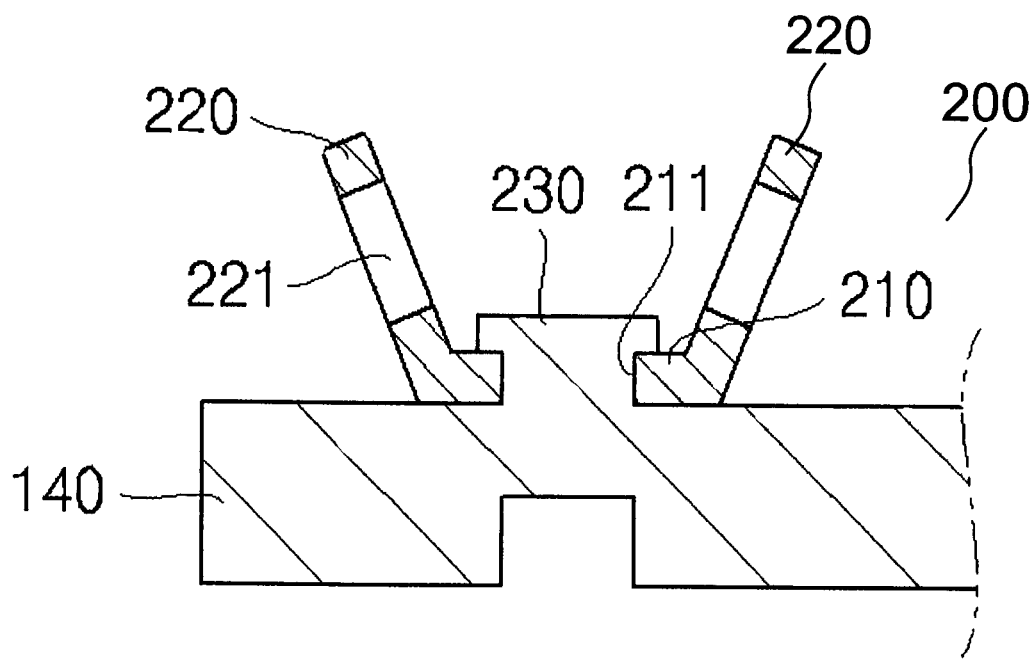

Moreover, reinforcing member 200 may have another resin fixing part 220 formed on the other end of support plate part 210 corresponding to resin fixing part 220 which is preformed on support plate part 210 with taking the perpendicular at midpoint of support plate part 210 as an axis, and therefore it forms a C shape '⊔' as shown in FIG. 3e, the shape of a truncated triangle '⊿' as shown in FIG. 3f, or the shape of a trough '⌣' as shown in FIG. 3g.

Figure 4A:
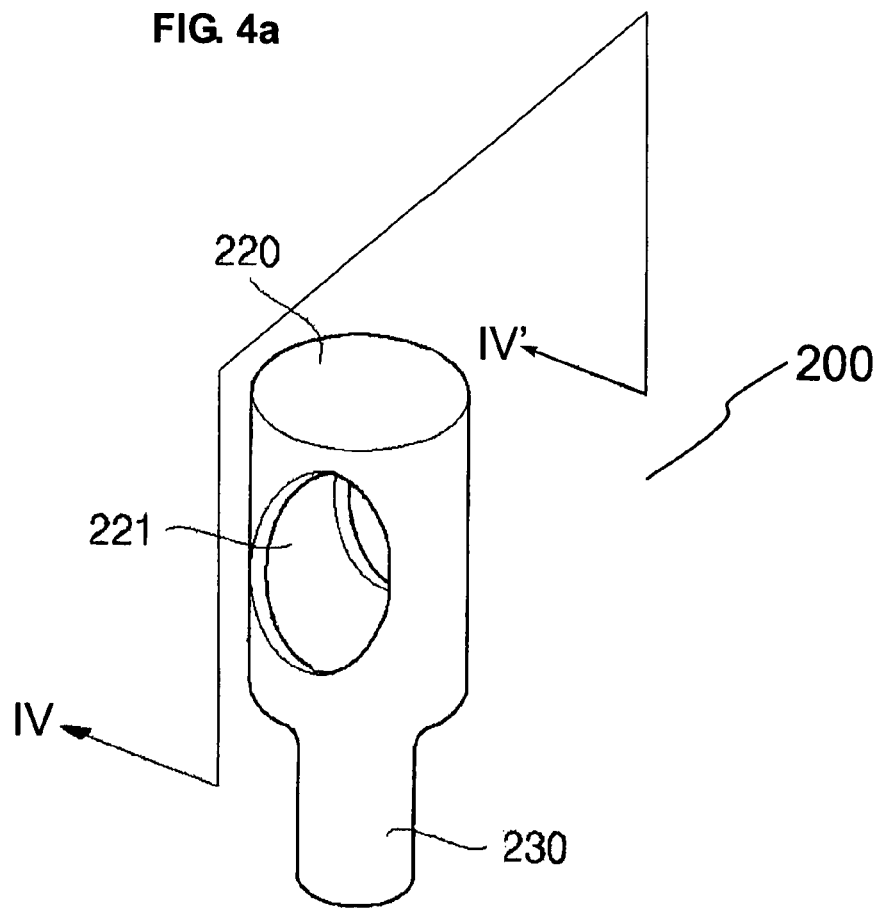
FIG. 4a is a perspective view of a reinforcing member according to another embodiment of the present invention.
Figure 4B:
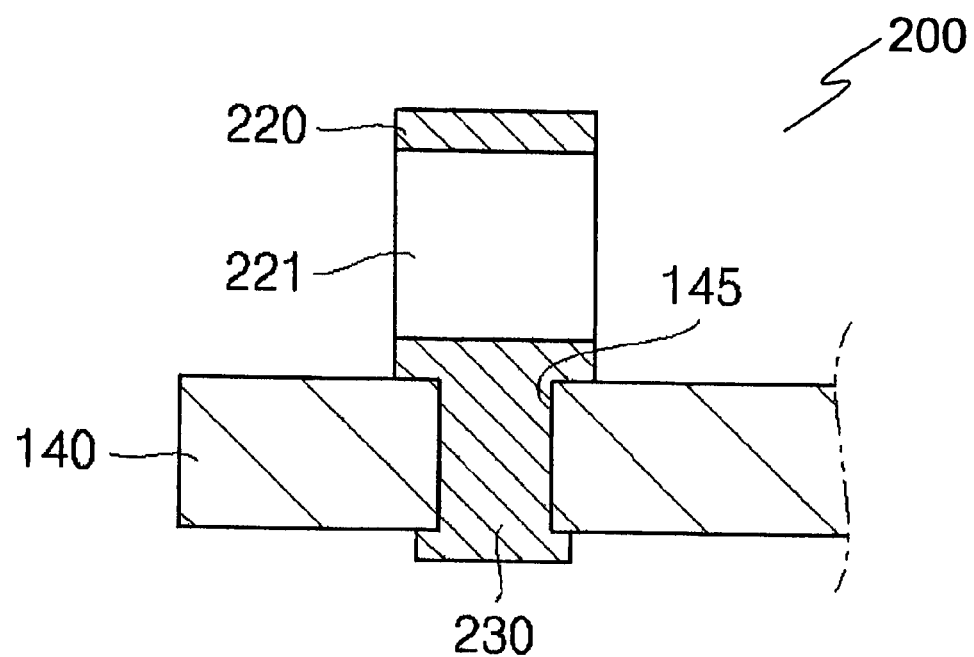

As shown in FIGS. 4a and 4b, a reinforcing member 200 according to another embodiment is composed of a resin fixing part 220 protruded toward protection circuit module 300 at one end of cap plate 140; and a rivet connecting part 230 attaching the resin fixing part 220 with cap plate 140.

At least one resin supporting hole 221, which supports the resin member as the perforating resin is molded, is formed in resin fixing part 220. Resin supporting hole 221 has the same structure and function as another embodiment of reinforcing member 200.

A rivet connecting part 230 is stepped-formed in the bottom of resin fixing part 220, and a connecting hole 145, through which rivet connecting part 230 passes, is formed at the corresponding region on which rivet connecting part 230 is fixed. Reinforcing member 200 is fixed to cap plate 140 by pressing rivet connecting part 230 passing through connecting hole 145 on the bottom of cap plate 140.

Meanwhile, even though it is not illustrated, reinforcing member 200 is fixed to cap plate 140 by connecting rivet connecting part 230 passing through connecting hole 145 to the bottom of cap plate 140 by means of a separate fixing means, for example a recess, in which a rivet is inserted.

Protection circuit module 300 is composed of a protection circuit board a connecting terminal electrically connected to the protection circuit board, and a lead plate connecting bare cell 100 with the connecting terminal.

As shown in FIG. 1, the protection circuit substrate is arranged horizontally parallel to cap plate 140 in the upper part of bare cell 100 and connected with cap plate 140, and is formed in the same size and shape as cap plate 140, which is an opposing surface of bare cell 100, thus the protection circuit, which devises the safety of the battery by preventing the overcharge and the over-discharge, is achieved.

And, an external terminal which is to be connected with an external device is formed on the external surface of the protection circuit board, and a connecting terminal is electrically connected to the internal surface, which is an opposing surface of cap plate 140, thus the protection circuit, the external terminal and the connecting terminal are electrically connected to each other via the conductive structure passing through the protection circuit board.

The connecting terminal is electrically connected with bare cell 100 via the lead plate, wherein the lead plate is made of typical nickel material.

The resin member is formed by pouring the melt resin into the gap between bare cell 100 and protection circuit module 300.

Hereinafter, the function of the rechargeable battery according to one embodiment of the present invention will be described.

The rechargeable battery according to one embodiment of the present invention is configured that bare cell 100 and protection circuit module 300 which is electrically connected with bare cell 100 are combined by the resin member molded of the melt resin.

The resin member, which attaches protection circuit module 300 to bare cell 100, is easily deformed by the bending or the twisting due to the external force because the material of the resin member is different from that of bare cell 100 and the area of the resin member is not large enough. Therefore, the resin member lowering a fixing force is easily detached from the bare cell by the external force.

To prevent the deformation of the resin member by increasing the vulnerable fixing force of the resin member, as shown in FIG. 1, a reinforcing member 200 is installed on one side of cap plate 140, which is the upper end of bare cell 100 of the rechargeable battery.

Reinforcing member 200 may have various shapes as shown in FIGS. 2b to 2g and 3b to 3g. That is, the reinforcing member is composed of a support plate part 210 which is fixed to one side of cap plate 140 by a rivet connecting part 230; and a resin fixing part 220 which is integrally connected to one end of support plate part 210 and is bent at a right angle with respect to support plate part 210 in the direction of protection circuit module 300. The bent resin fixing part 220 strengthens the shear stress of the resin member, and thereby increasing the fixing force of the resin member.

And, resin supporting hole 221, in which the melt resin passes through, is formed in resin fixing part 220 as described in FIGS. 3a and 4a. The melt resin closes resin supporting hole 221 by being inserted into resin supporting hole 221 and molding it. Therefore, the mechanical binding force of the resin member, reinforcing member 20, and bare cell 100 may be further increased.

Therefore, reinforcing member 200 prevents the deformation against a bending test or a twisting test of the rechargeable battery by increasing the shear stress of the resin member, and prevents the resin member from being detached from bare cell 100.

It is to be understood that the present invention is not limited to the embodiments or the drawings described above, but encompasses any and all embodiments within the scope of the following claims. Obviously, other modifications and variations of the present invention may be possible in light of the foregoing descriptions by the skilled man in the art. It is therefore to be understood that within the scope of the appended claims the invention may be practiced otherwise than as specifically described.

As described above, the present invention prevents the resin member from being deformed by bending or twisting due to the external force as the reinforcing member increasing the fixing force is included therein, and prevents the resin member from being detached therefrom.

What is claimed is:

1. A rechargeable battery, comprising:
   a bare cell provided with an electrically conductive cap plate;
   a protection circuit module electrically connected to the bare cell;
   a resin member molded to fill a gap between the bare cell and the protection circuit module and molded therein; and
   a reinforcing member which comprises:
      a support plate connected to one side of the cap plate and perforated by a rivet through-hole;
      a resin fastener integrally formed together with one end of the support plate and bent at an angle with respect to the support plate in a direction of the protection circuit module, the resin fastener protruding from the cap plate towards the protection circuit module; and
      a rivet formed from an electrically conductive material and disposed on the one side of the cap plate and the rivet integrally formed with the cap plate as a monolithic single body, the rivet perforating the rivet through-hole and fixing the support plate to the cap plate, the rivet geometrically corresponding to a recess which is formed on an opposite side of the cap plate.

2. The rechargeable battery of claim 1, wherein at least one resin supporting hole perforates the resin fastener and supports the resin member when a perforating resin is molded in the resin supporting hole.

3. The rechargeable battery of claim 1, wherein the rivet is integrally formed on one side of the cap plate, the rivet comprises a protrusion protruding from the cap plate towards the protection circuit module, and an upper part of the rivet is pressed.

4. The rechargeable battery of claim 2, wherein the rivet is integrally formed on one side of the cap plate, the rivet comprises a protrusion protruding from the cap plate towards the protection circuit module, and an upper part of the rivet is pressed.

5. The rechargeable battery of claim 1, wherein the reinforcing member forms a right angle when the resin fastener is bent at a right angle with respect to the support plate.

6. The rechargeable battery of claim 2, wherein the reinforcing member forms a right angle when the resin fastener is bent at a right angle with respect to the support plate.

7. The rechargeable battery of claim 1, wherein the reinforcing member forms an acute angle when the resin fastener is bent at an acute angle with respect to the support plate.

8. The rechargeable battery of claim 2, wherein the reinforcing member forms an acute angle when the resin fastener is bent at an acute angle with respect to the support plate.

9. The rechargeable battery of claim 1, wherein the reinforcing member forms an obtuse angle when the resin fastener is bent at an obtuse angle with respect to the support plate.

10. The rechargeable battery of claim 2, wherein the reinforcing member forms an obtuse angle when the resin fastener is bent at an obtuse angle with respect to the support plate.

11. The rechargeable battery of claim 5, wherein the reinforcing member further includes another resin fastener on the other end of the support plate, the another resin fastener is formed symmetrically to the resin fastener which is preformed on the support plate with respect to a perpendicular line taken at midpoint of the support plate.

12. The rechargeable battery of claim 6, wherein the reinforcing member further includes another resin fastener on the other end of the support plate, the another resin fastener is formed symmetrically to the resin fastener which is preformed on the support plate with respect to a perpendicular line taken at midpoint of the support plate.

13. A rechargeable battery, comprising:
a bare cell provided with an electrically conductive cap plate;
a protection circuit module electrically connected to the bare cell;
a resin member molded to fill a gap between the bare cell and the protection circuit module and molded therein; and a reinforcing member comprising:
a resin fastener protruding from the cap plate towards the protection circuit module and disposed at one side of the cap plate, and the resin fastener supporting the resin member by bearing at least one resin supporting hole which supports the resin member when a perforating resin is molded; and
a rivet formed from an electrically conductive material and the rivet integrally formed with the cap plate as a monolithic single body, the rivet protruding from a bottom of the resin fastener, the rivet disposed on the one side of the cap plate, the rivet geometrically corresponding to a recess which is formed on an opposite side of the cap plate.

14. A rechargeable battery, comprising:
a bare cell provided with an electrically conductive cap plate;
a protection circuit module electrically connected to the bare cell;
a resin member molded to fill a gap between the bare cell and the protection circuit module; and
a reinforcing member comprising a support plate connected to one side of the cap plate and perforated by a rivet through-hole, a resin fastener integrally formed together with one end of the support plate and bent to protrude at an angle in the direction of the protection circuit module, and a rivet formed from an electrically conductive material and integrally formed with the cap plate as a monolithic single body, the rivet extending through the rivet through-hole and attaching the support plate to the cap plate, the rivet disposed on the one side of the cap plate, the rivet geometrically corresponding to a recess which is formed on an opposite side of the cap plate.

15. The rechargeable battery of claim 14, with the rivet integrally formed together with the cap plate on one side of the cap plate.

16. The rechargeable battery of claim 14, with the rivet formed separately from the cap plate.

17. A rechargeable battery, comprising:
a bare cell provided with an electrically conductive cap plate;
a protection circuit module electrically connected to the bare cell;
a resin member molded to fill a gap between the bare cell and the protection circuit module; and
a reinforcing member comprising a resin fastener protruding toward the protection circuit module at one side of the cap plate and supporting the perforating molded resin member by at least one resin supporting hole on the resin fastener, and a rivet formed on a bottom of the resin fastener and attached to the cap plate, the rivet formed from an electrically conductive material and integrally formed with the cap plate as a monolithic single body, the rivet disposed on the one side of the cap plate, the rivet geometrically corresponding to a recess which is formed on an opposite side of the cap plate.

* * * * *